United States Patent [19]
Boisrobert et al.

[11] Patent Number: 5,500,733
[45] Date of Patent: Mar. 19, 1996

[54] INTERFEROMETRIC SYSTEM FOR THE DETECTION AND LOCATION OF REFLECTING FAULTS OF LIGHT-GUIDING STRUCTURES

[75] Inventors: Christian Boisrobert, Perros Guirel; Jean-Francois Lucas, Caovennel; Michel Dontenwille, Corlay, all of France

[73] Assignee: France Telecom, Paris, France

[21] Appl. No.: 211,220

[22] PCT Filed: Jul. 26, 1993

[86] PCT No.: PCT/FR93/00763

§ 371 Date: Mar. 24, 1994

§ 102(e) Date: Mar. 24, 1994

[87] PCT Pub. No.: WO94/02823

PCT Pub. Date: Feb. 3, 1994

[30] Foreign Application Priority Data

Jul. 27, 1993 [FR] France ................................. 92 09225

[51] Int. Cl.$^6$ .................................................. G01B 9/02
[52] U.S. Cl. .................. 356/345; 356/73.1; 250/227.27
[58] Field of Search ................................. 356/345, 357, 356/73.1; 359/34; 385/12, 13; 250/227.14, 227.15, 227.27, 227.19

[56] References Cited

U.S. PATENT DOCUMENTS

| | | | |
|---|---|---|---|
| 4,752,132 | 6/1988 | Pavlath | 356/345 |
| 4,753,529 | 6/1988 | Layton | 356/345 |
| 4,759,627 | 7/1988 | Thylén et al. | 356/345 |
| 4,770,535 | 9/1988 | Kim et al. | 356/345 |
| 4,994,668 | 2/1991 | Lagakos et al. | 356/345 |
| 5,093,568 | 3/1992 | Maycock | 250/227.15 |
| 5,194,847 | 3/1993 | Taylor et al. | 340/557 |
| 5,301,001 | 4/1994 | Murphy et al. | 356/345 |
| 5,323,229 | 6/1994 | May et al. | 356/345 |

FOREIGN PATENT DOCUMENTS

| | | | |
|---|---|---|---|
| 1315797A | 4/1984 | U.S.S.R. | 356/345 |
| 9402823 | 2/1994 | WIPO | |

OTHER PUBLICATIONS

"High–spatial–resolution and high–sensitivity interferometric optical–time–domain reflectometer", Masaru Kobayashi et al., SPIE Conference, Orlando, Florida, Apr. 1–5, 1991, 1474–40.

Electronics Letters, vol. 21, No. 18, Aug. 1985, ENAGE GB, pp. 781–783 M. Tsubokawa et al., "Chromatic Deispersion Measurement of a SM Fibre by Optical Heterodyne Interferometry".

Patent Abstracts of Japan, vol. 14, No. 156 (E–908) Mar. 26, 1990 & JP 2,015,685 (Yokogawa Electric Corp.) Jan. 19, 1990.

French Search Report—FR 9209225—476161 (FA)—Mar. 15, 1993.

International Search Report–PCT/FR93/00763–Sep. 17, 1993.

*Primary Examiner*—Samuel A. Turner
*Attorney, Agent, or Firm*—Pearne, Gordon, McCoy & Granger

[57] ABSTRACT

An interferometric system for sensing and locating reflective defects in light-conducting structures comprises a monomode laser source (6), an incoherent source (4) with substantially the same central wavelength as the laser source, first and second couplers (10, 20) connected to the sources and to light sensors (52, 54), a first support (36) movable in one direction (D) and connected to the ends of the first and second couplers, a second support (38) oscillating in the same direction (D), reflectors (42, 43) attached to the second support opposite the ends of the first and second couplers. A third support support (40) is movable in the same direction (D) and connected to one end of the second coupler (20), a further stationary reflector (48) opposite said end, of the second coupler. The first coupler is connected to an optical waveguide (2), and devices (56, 58) for locating reflective defects in the waveguide.

6 Claims, 4 Drawing Sheets

INTERFEROMETRIC SYSTEM FOR THE DETECTION AND LOCATION OF REFLECTING FAULTS OF LIGHT-GUIDING STRUCTURES

BACKGROUND OF THE INVENTION

The present invention relates to an interferometric system for the detection and location of reflecting faults in light-guiding structures.

The term "light-guiding structures" is understood to mean optical waveguides, such as e.g. optical fibers, optical couplers and even lasers.

The present invention more particularly applies to the field of optical telecommunications and permits the location of weakly reflecting diopters in such optical guides with a high resolution.

The invention also makes it possible to measure the transmission characteristics of such optical guides, as well as the reflection coefficients of passive or active guiding structures.

An interferometric system for the detection and location of reflecting faults is already known from the document "High-spatial-resolution and high-sensitivity interferometric optical-time-domain reflectometer", Masaru Kobayashi, Juichi Noda, Kazumasa Takada and Henry F. Taylor, SPIE Conference, Orlando, Fla., Apr. 1–5, 1991, 1474–40.

SUMMARY OF THE INVENTION

The present invention solves the problem of obtaining an interferometric system able to accurately define the position of propagation "incidents" distributed along optical guides. For this purpose, the present invention makes use of a Michelson interferometer in incoherent light, as well as interferometric means with counting of interference fringes by laser.

More specifically, the present invention relates to an interferometric system for the detection and location of reflecting faults of light guidance structures, the system being characterized in that it includes:

an incoherent light source, a monomode laser source, whose wavelength is substantially equal to the central wavelength of the incoherent source, first and second optical couplers, whose first respective branches are optically coupled to the incoherent source and to the laser source, a first support displaceable in translation in a given direction and to which are fixed the ends of the second branches of the first and second couplers, a second support able to oscillate in a given direction, first and second light reflectors fixed to the second support and respectively placed facing the ends of the second branches of the first and second couplers in order to reflect there the light passing out of the same, a third support displaceable in translation in the given direction and to which is fixed the end of a third branch of the second coupler, a third light reflector fixed and positioned facing said end of the third branch of the second coupler in order to reflect there the light passing out of the same, a third branch of the first coupler being optically coupled to the guiding structure, first and second photodetectors respectively optically coupled to fourth branches of the first and second couplers, an interference fringe counter, whose input receives the signals supplied by the second photodetector and means for analyzing signals supplied by the first and second photodetectors, said analysis means serving to locate the reflecting faults of the guidance structure, with the aid of appropriate displacements of the first, second and third supports and the counter.

The present invention also makes it possible, by using the signal processing by correlation, to lower the detection threshold or "minimum detectable power" by at least one decade compared with the aforementioned known system and without having a prejudicial influence on the spatial resolution.

The system according to the invention can also comprise a third optical coupler, whose first and second branches are respectively optically coupled to the incoherent source and to the laser source and whose third and fourth branches are respectively optically coupled to the first branches of the first and second couplers.

According to a special embodiment of the system according to the invention, the analysis means incorporate a two-channel oscilloscope respectively receiving the signal supplied by the first and second photodetectors, said oscilloscope displaying interferograms corresponding to said signals.

The system according to the invention can also comprise piezoelectric means which are able to oscillate the second support in the given direction.

According to a preferred embodiment of the system according to the invention, the system includes means for regulating the speed of the displacement of the second support, the regulating means serving to impose a constant displacement speed on the second support.

These regulating means can comprise a Michelson interferometer having a light source, whose coherence length is above the amplitude of the displacement of the second support, two arms respectively terminated by two light reflectors, whereof one is rendered rigidly integral with the second support and a third photodetector, as well as means for controlling the piezoelectric means as a function of the signal supplied by said third photodetector, the control means imposing a constant displacement speed on the second support via the piezoelectric means.

BRIEF DESCRIPTION OF THE DRAWINGS

The invention is described in greater detail hereinafter relative to non-limitative embodiments and with reference to the attached drawings, wherein.

DETAILED DESCRIPTION OF THE PREFERRED EMBODIMENTS

Figure 1:
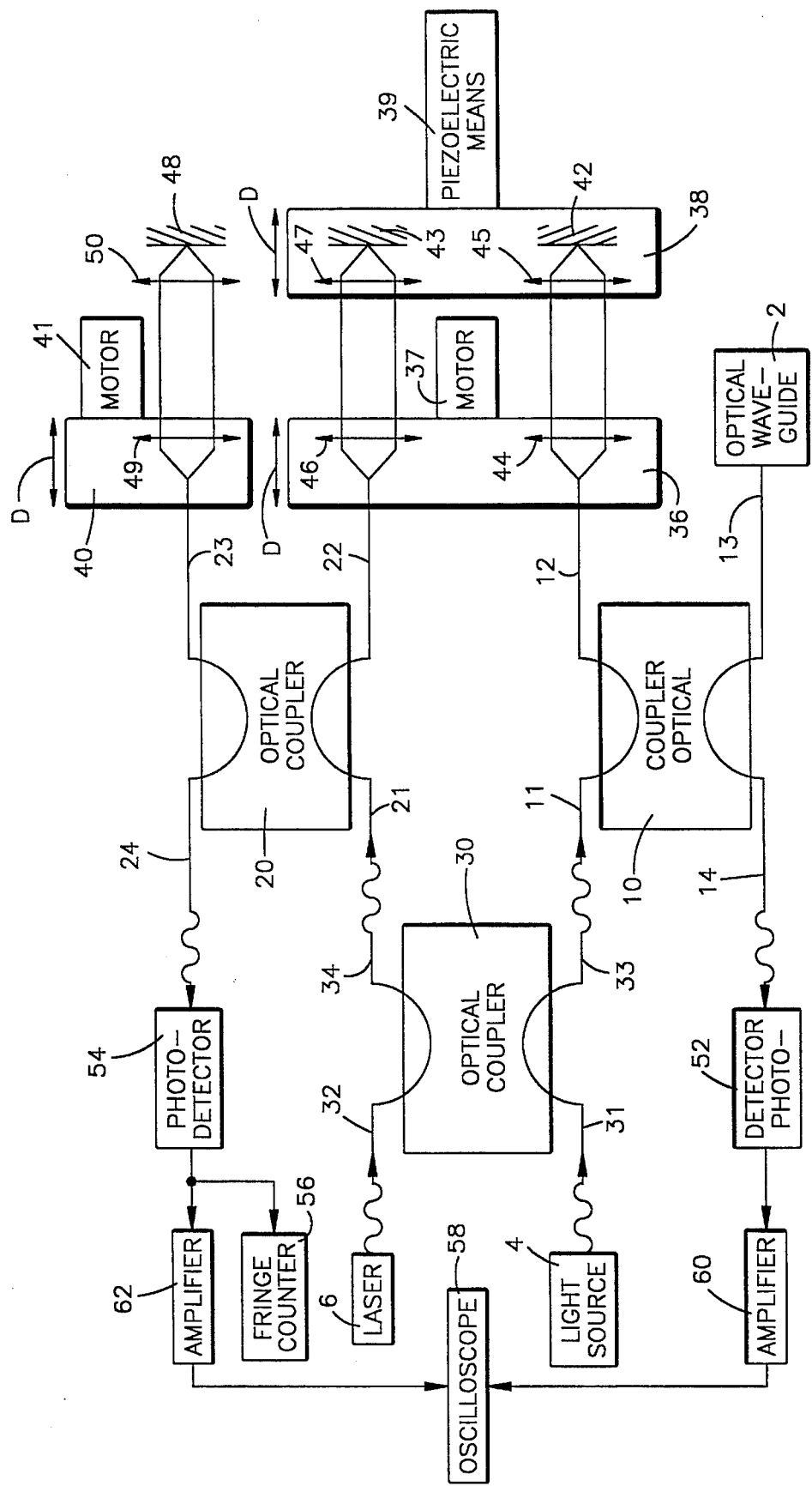
FIG. 1 A diagrammatic view of a special embodiment of the system according to the invention.

An interferometric system according to the present invention, which is diagrammatically shown in FIG. 1, is used for detecting and locating one or more reflecting faults which an optical waveguide 2 my have. This system also comprises an incoherent light source 4 constituted by an electroluminescent diode emitter having a wide optical spectrum, as well as a monomode laser emitter 6, whose wavelength is substantially equal to the central wave-length of the incoherent source 4.

The system of FIG. 1 also comprises first, second and third optical couplers 10, 20 and 30 of the 2×2 type and having monomode optical fibers. Each optical fiber has four optical fiber branches which, for the first coupler 10, carry the references 11, 12, 13 and 14, for the second coupler 20 the references 21, 22, 23 and 24 and for the third coupler 30 the references 31, 32, 33 and 34.

The system according to FIG. 1 also comprises three supports respectively constituted by a first plate 36, which is displaceable in translation parallel to a given direction D, a second plate 38 able to oscillate in the same direction D and a third plate 40 displaceable in translation in the same direction D.

The first and third plates 36 and 40 are respectively associated with motors 37 and 41 permitting their translation in the direction D and the second plate 38 is associated with piezoelectric means 39 able to oscillate the second plate 38 in said direction D.

The ends of the optical fibers 12 and 22 respectively belonging to the first and second couplers 10 and 20 are fixed to the plate 36 parallel to the direction D.

In the same way, one end of the optical fiber 23 belonging to the second coupler 20 is fixed to the third plate 40 parallel to the direction D.

On the second plate 38, which follows the first plate 36 and which faces the first plate 36, are mounted light reflectors 42, 43, respectively facing ends of the fibers 12 and 22. These light reflectors 42, 43 reflect light beams passing out of the fibers 12, 22, so as to return the beams into the fibers 12, 22.

Optics 44, 45 are respectively fixed to the first and second plates 36, 38, the optics 44 being on the first plate 36 positioned facing the end of the fiber 12 and the optics 45 being positioned on the second plate 38 facing reflector 42, so that a light beam from the fiber 12 is transformed into a beam having parallel rays by the optics 44 and said latter beam is focussed on the reflector 42 by the optics 45, said beam then returning into the optical fiber 12 by means of the optics 45, 44.

In the same way, optics 46, 47 are respectively fixed to the plates 36, 38, the optics 46 being placed on the first plate 36 facing the end of the optical fiber 22 and the optics 47 being placed on the second plate 38 facing the light reflector 43, the optics 46 transforming a light beam from the fiber 22 into a beam having parallel rays, which is focussed onto the light reflector 43 by the optics 47, said beam being reflected by the reflector 43 and returning into the optical fiber 22 by means of the optics 47 and then the optics 46.

There is a fixed light reflector 48 in front of the third plate 40. The reflector 48 is more precisely positioned facing the end of the fiber 23, which is fixed to the third plate 40. The reflector 48 reflects a light beam from the end of the fiber 23, so that said beam returns into the said fiber.

An optics 49 is fixed to the third plate 40 facing the said end of the fiber 23 in order to transform a light beam emitted from the fiber 23 into a beam having parallel rays.

An optics 50 is positioned facing the reflector 48 and is fixed with respect to the reflector 48, so as to focus the beam with parallel rays onto the reflector 48, so that it returns into the end of the fiber 23 via the optics 50 and then the optics 49.

The system shown in FIG. 1 also comprises two photodetectors 52, 54, which are respectively optically first and second coupled to the ends of the fibers 14, 24 belonging to the couplers 10, 20. Thus, the photodetector 52 supplies an electric signal when it receives a light beam from the optical fiber 14 and the photodetector 54 supplies an electric signal when it receives a light beam from the optical fiber 24.

Moreover, as can be seen in FIG. 1, the fibers 31, 32 are respectively optically coupled to the incoherent source 4 and the laser source 6, the end of the optical fiber 13 of the first coupler 10 being optically coupled to on end of the optical guide 2 and the ends of the fibers 11 and 21 of the first and second couplers 10 and 20 are respectively optically coupled to the ends of the optical fibers 33, 34 of the third coupler 30, so that the light beams are propagated in said ends of the fibers 33 and 34 and then respectively are able to pass into the fibers 11 and 21 of the first and second couplers 10 and 20.

The system of FIG. 1 also comprises an interference fringe counter 56, whose input is connected to the output of the photodetector 54, as well as a two-channel, digital oscilloscope 58, whereof one channel receives the output signal from the detector 52 via an amplifier 60 and whose second channel receives the output signal of the photodetector 54 via an amplifier 62.

The third coupler 30 supplies half the light intensity reaching it from the incoherent source 4 and/or the laser emitter 6 to the fiber 11 and the other half of said intensity to the fiber 21.

The first optical coupler 10, which is an essential component of the interferometric system diagrammatically shown in FIG. 1, serves as the beam splitter of a Michelson interferometer. When the first coupler 10 receives radiation by its fiber 11, it delivers half of this radiation to the fiber 12 and the other half to the fiber 13 and then mixes the radiation from the reflector 42 reaching it by the fiber 12 and the radiation reflected by one or more reflecting faults of the guide 2 and reaching it by the fiber 13, in order to supply the mixed radiation to the photodetector 52.

The second optical coupler 20 also serves as a beam splitter for a second Michelson interferometer. The second coupler 20 receives radiation by its fiber 21 and delivers this radiation to the fiber 22 and the other half to the fiber 23. The second coupler 20 mixes the radiation respectively reflected by the reflectors 43 and 48 and reaching it by the fibers 22 and 23 in order to deliver the thus mixed radiation to the photodetector 54.

Initially, the question as to whether a reflecting diopter is in the optical waveguide 2 is ignored. If such a diopter exists, the photodetector 52 will indicate its presence by supplying electric signals leading to an interferogram of the type shown in FIG. 2 on the oscilloscope 58 (channel 1).

Such an interferogram is obtained by varying the distance between the end of the fiber 12, which is fixed to the first plate 36, and the reflector 42.

Figure 2:
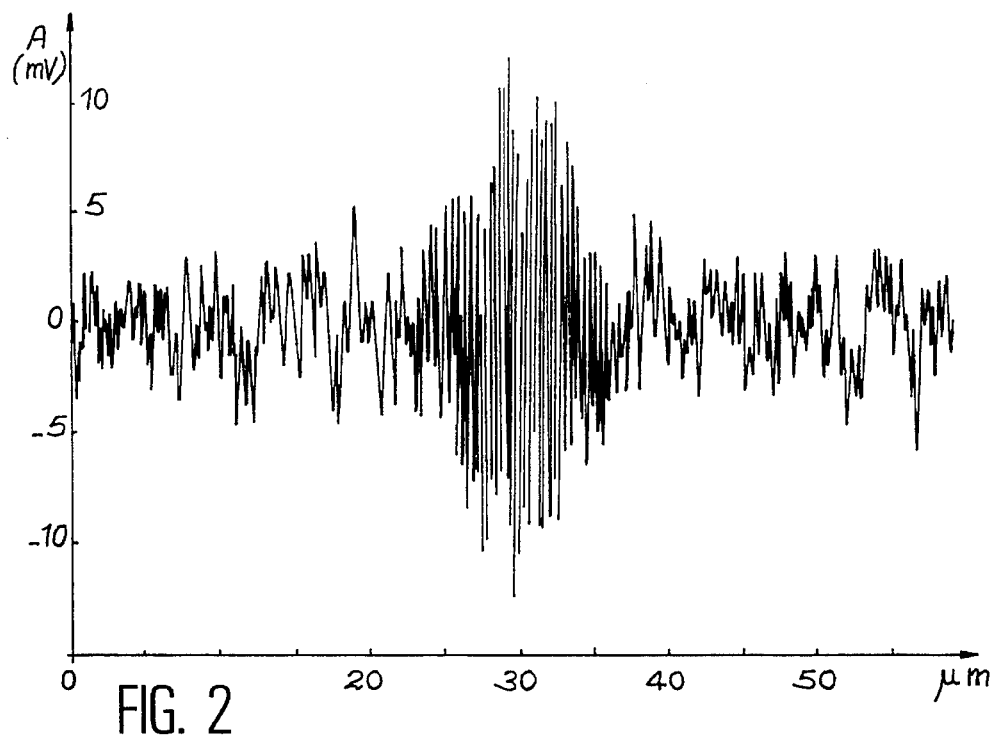
FIG. 2 An interferogram obtained by means of the system according to FIG. 1 and which corresponds to a weakly reflecting diopter.

The interferogram of FIG. 2, which corresponds to a diopter having a low reflection coefficient, is plotted in a marking system, whose ordinate axis corresponds to the reflection amplitudes A and whose abscissa axis corresponds to a distance covered by the second plate 38 and expressed in micrometers.

The maximum amplitude of the interferogram corresponds to the equality between the optical length of the arm of the first Michelson interferometer, which is terminated by the light reflector 42, and the optical length of the branch of the interferometer, which is terminated by the reflecting diopter of the optical waveguide 2.

If the optical waveguide 2 has several reflecting diopters, obviously several successive interferograms will be obtained.

The form and amplitude of each interferogram is dependent on the optical spectrum of the incoherent light source 4 used for producing these interferograms and is also dependent on the optical characteristics of the reflecting diopter, as well as the displacement speed of the light reflector 42 with respect to the end of the optical fiber 12.

If a harmonic analysis in Fourier transform is made of the interferogram of FIG. 2, a component at frequency Fo (carrier frequency of the interferograms) indicates the presence of a reflecting diopter, or reflecting center, with a signal quality which is better than in the case of FIG. 2.

Thus, it is pointed out that all the interferograms "contain" a carrier frequency close to Fo and it is sufficient to seek all the signals spectrally centered on Fo in the photocurrent supplied by the photodetector 52 in order to find all the reflecting diopters.

This frequency Fo is also the carrier frequency of the interferograms supplied by the photodetector 54, because the latter interferograms are produced during identical translations of the reflector 42 and the reflector 43.

Thus, the reflectors 42 and 43 are fixed to the second plate 38, which is put into movement with the aid of the piezoelectric means 39 and travel at the same speed and over the same distance.

The displacement of the first plate 36 is controlled by counting fringes with the aid of the photodetector 54 in the second Michelson interferometer, when the laser emitter 6 is used as the light source.

Figure 3:
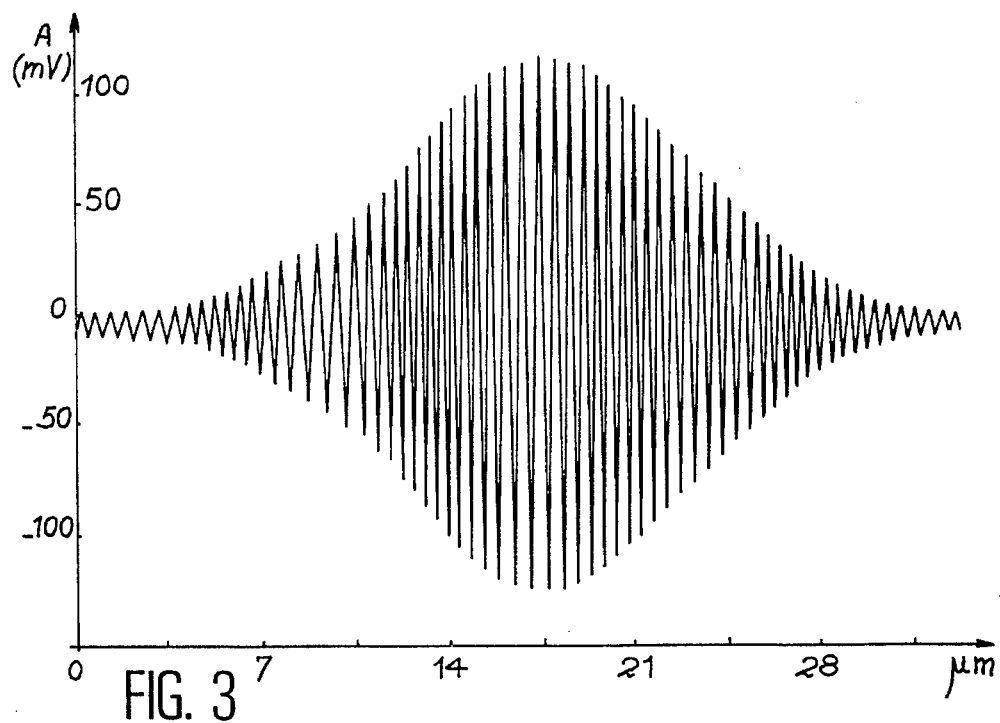
FIG. 3 Another interferogram obtained with a laser source used in said system.

FIG. 3 shows an interferogram obtained on the oscilloscope 58 (channel 2) with the aid of the photodetector 54, when the laser emitter 6 is used as the light source and on the basis of this interferogram it is possible to obtain information on the frequency Fo of the interference fringes and which is the carrier frequency of the interferograms.

The collimating system formed by the end of the fiber 23 and the optics 49 is kept fixed during the displacements of the first plate 36.

When the first plate 36 occupies the position in which the arms of the first interferometer, respectively terminated by the reflector 42 and the reflecting diopter of the guide 2, have the same optical length (cf. hereinbefore), the third plate 40 is put into movement and the photodetector 54 resumes its fringe counting in order to control this movement until the third plate 40 reaches a position in which the respective optical lengths of the arms of the second interferometer, which are terminated by the light reflectors 43, 48, are equal. When this position is reached, the laser emitter 6 is cut out and the electroluminescent diode 4 is used as the light source for supplying a light beam into the fiber 21 of the second coupler 20.

The displacement of the plate 38 finally gives rise to two interferograms, which are supplied by the photodetectors 52, 54 and whose carrier frequencies are extremely close.

The first of these two interferograms is detectable under optimum conditions by correlation with the second interferogram and the appearance of this first interferogram is perfectly located by fringe coating in the second interferometer (having the second optical coupler 20).

More precise details will be given hereinafter of the way of using the interferometric system shown in FIG. 1.

The first step is to define an origin with respect to which the position of the reflecting diopter of the optical waveguide 2 will be given. This origin corresponds to the end of the optical waveguide 2, which is optically coupled to the optical fiber 13 of the first coupler 10. In order to do this, the incoherent light source 4 is made to operate, the laser emitter 6 being extinguished.

The first plate 36 is moved until the quality is obtained between the optical lengths of the arms of the first interferometer, which are respectively terminated by the reflector 42 and the reflecting diopter taken as the origin (end of the guide 2). During these operations the second plate 38 is kept fixed.

On the oscilloscope 58 (channel 1) is obtained an interferogram, whose maximum amplitude corresponds to equality between these optical lengths.

The first plate 36 is then immobilized in this position corresponding to equality of the optical lengths. The second plate 38 is oscillated. The motor 37 of the first plate 36 is actuated so as to bring the interferogram obtained to a chosen position on the screen of the oscilloscope 58. The first plate 36 is then stopped. The laser emitter 6 is then made to function.

The third plate 40 is moved until equality of the optical lengths of the arms of the second interferometer is obtained and this is terminated by the reflector 43 and the reflector 48. This is detected by means of the photodetector 54 and an interferogram (channel 2) is obtained on the screen of the oscilloscope 58.

Coincidence is then brought about between the respective maxima of the two interferograms obtained on said screen, by displacing the third plate 40 over a length permitting this coincidence. The fringe counter 56 is set to zero. The laser emitter 6 is extinguished. It is then possible to find the distance between the reflecting defect of the optical waveguide 2 and the thus defined origin. To do this, the first plate 36 is moved until detection takes place of the reflecting defect or fault of the waveguide 2. This detection takes place when a new interferogram appears on the channel 1 of the oscilloscope 58. The first plate 36 is then stopped (with the second 38 still oscillating). The laser emitter 6 is put into operation.

The fringe counter 56 is actuated and the third plate 40 is displaced until coincidence is brought about between the maximum of the interferogram of channel 2 and the maximum of the new interferogram of channel 1. The third plate 40 is then stopped .

However, each interference fringe is spaced from an adjacent fringe by a length equal to half the wavelength of the laser emitter 6.

Thus, it is possible to determine the distance between the origin and the reflecting fault of the waveguide 2 by multiplying the number N of interference fringes counted by half said wavelength.

In order to make the oscillation speed of the third plate 38 as constant as possible, the third plate 38 is provided with means for regulating the speed. An optical method is advantageously used for measuring the displacement of the second plate 38.

Such a method makes it possible to measure displacements of approximately 0.1 micrometer in accordance with the wavelength of the light source used for performing the optical method. The principle of the method is diagrammatically illustrated in FIG. 4.

This measurement is performed by using another Michelson interferometer 82, which once again has a type 2×2 optical coupler 64 with optical fibers, hereafter referred to as the fourth optical coupler.

The fourth coupler 64 has four branches or optical fibers, the first branch being coupled to a light source 66, the second to a receiving photodiode 68 and the third to a total reflection mirror 70, which is fixed and which reflects into said branch the light passing out of the same.

A mirror 72 is rigidly integral with the second plate 38, so that it moves parallel to the direction D. The end of the fourth branch of the fourth coupler 64 is fixed and positioned facing the mirror 72.

Two fixed optics 74, 76 are placed between the mirror 72 and the end of the fourth branch of the fourth coupler 64.

The optics 76 transforms a beam from the end at the fourth branch into a beam having parallel rays. The optics 74 focusses the beam with parallel rays onto the mirror 72, which reflects it and returns it into the end of the fourth branch of the fourth coupler 64 via the optics 74 and 76.

The intensity I(t) of the light detected by the photodiode 68 and therefore the intensity of the electric signal supplied by said photodiode 64 vary, as indicated hereinafter, as a function of the time t:

$$I(t) = Io(1 + ((4\pi F(t)/l)))$$

in which Io is a constant, π is 3.14 and l represents the wavelength of the light emitted from the light source 66.

The frequency F(t) is a function of the displacement speed of the second plate 38 and the wavelength of the light source 66. In order to regulate the speed, it is therefore sufficient to regulate the frequency of the signal supplied by the photodiode 68.

It is necessary to use a light source 66, whose coherence length exceeds the amplitude of the displacement of the second plate 38, the displacement being approximately 1 millimeter in the example described.

The light source 66 is, in exemplified manner, a laser diode DFB with a wavelength of 1550 nanometers.

The frequency control device of the signal supplied by the photodiode 68 is e.g. a phase locking control device, which is very simple to implement. This device is diagrammatically illustrated by FIG. 5.

It comprises a phase comparator 78 receiving at its input a reference frequency Fref, as well as the output signal of a Schnitt trigger, whose input is connected to the output of the photodiode 68.

Figure 4:
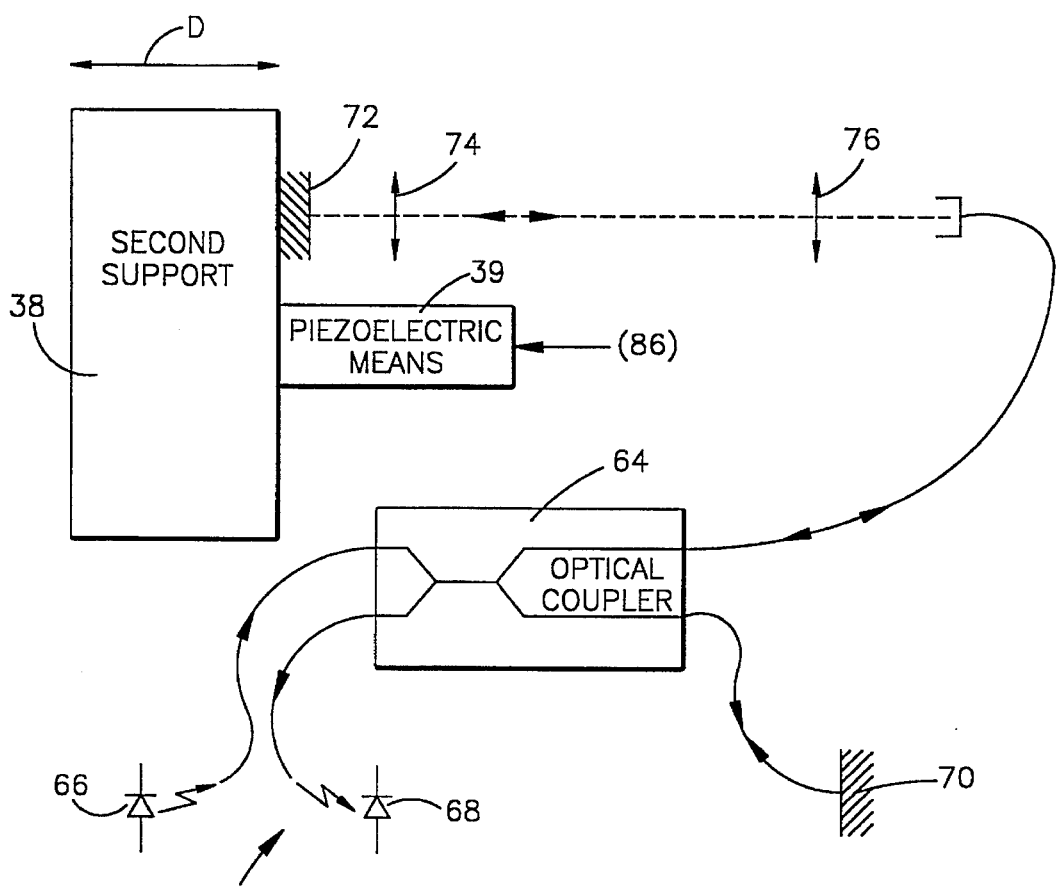
FIG. 4 A partial, diagrammatic view of means for regulating the displacement speed of the system plate shown in FIG. 1.
Figure 5:
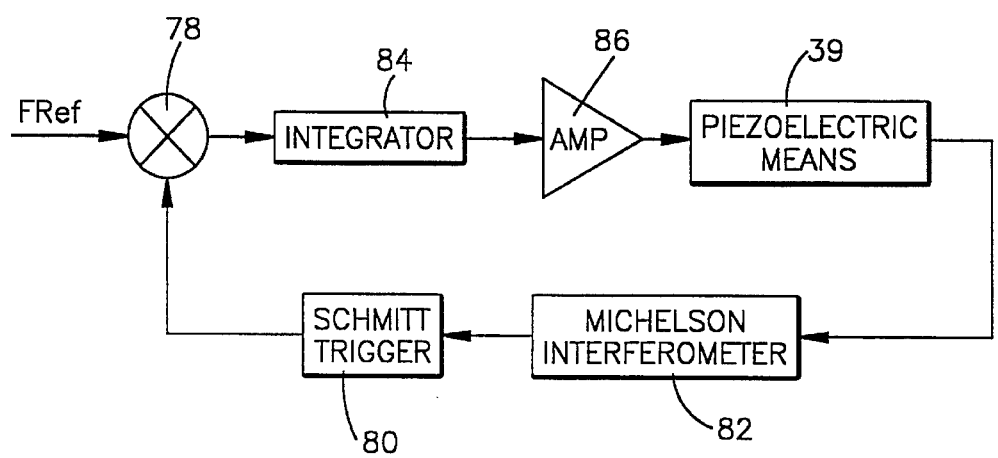
FIG. 5 Diagrammatically electronic means forming part of the regulating means.

In FIG. 5, block 82 represents the interferometer of FIG. 4.

The control device of FIG. 5 also comprises an integrator 84, whose input receives the output signal of the phase comparator 78, as well as an amplifier 86, which amplifies the output signal of the integrator 84. The output signal of the amplifier 86 controls the piezoelectric means 39 associated with the second plate 38.

Without servocontrol, the variation of the speed obtained with these piezoelectric means 39 is approximately 25% (the photodiode 68 then supplying a signal with a relatively wide spectrum).

However, the servocontrol described makes it possible to have a frequency variation smaller than 1 Hz around the reference frequency (e.g. 36 Hz, giving a speed of 28 micrometers per second), which corresponds to a speed variation below 2% (the spectrum of the signal supplied by the photodiode 68 then being very narrow).

On returning to the system of FIG. 1, it will be shown hereinafter that the displacement of a plate effectively makes it possible to displace an intererogram on the oscilloscope 58, with reference to FIGS. 6A to 6C. The fiber 13 and the optical waveguide 2 remain fixed.

The arms of the first Michelson interferometer, respectively comprising the fibers 12 and 13, have optical lengths which are very close to one another and which, for each position of the first plate 36, are perfectly equal for a given position of the second plate 38.

An oscillogram is plotted during the displacement of the second plate 38 (using the piezoelectric means 39) between two positions al and a2, for one position a of the first plate 36, while it is plotted during the displacement of the second plate 38 between two other positions b1 and b2, for another position b of the second plate 36.

Figure 6A:
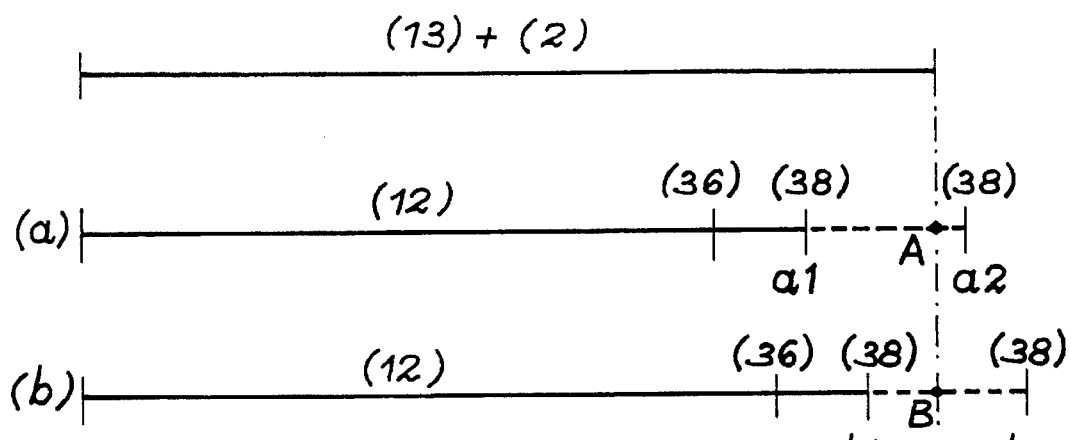
FIGS. 6A to 6C Diagrammatically the possibility of displacing an interferogram on the screen of an oscilloscope of the system of FIG. 1.

FIG. 6A shows that the positions A and B corresponding to the interferograms obtained for the positions a and b of the first plate 36 are not positioned at the same locations on their respective segments a1a2, b1b2.

Figure 6B:
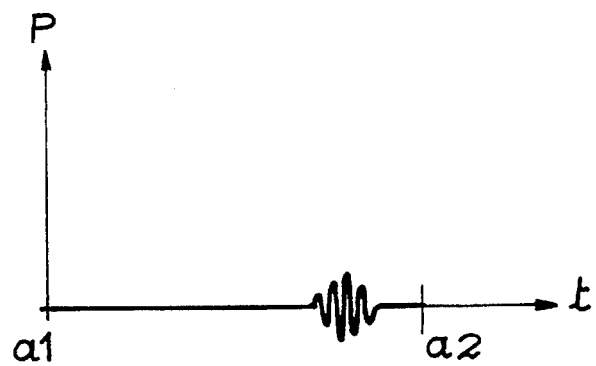
Figure 6C:
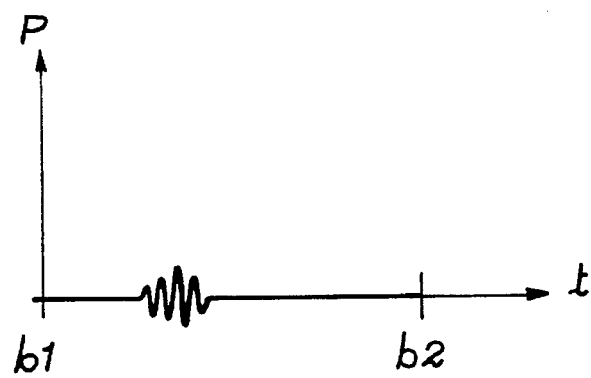

According to FIG. 6A, if the oscillograms are initiated at a1 and b1, the interferograms corresponding respectively to the positions a and b of the first plate 36 are observed in the manner shown in FIGS. 6B and 6C, where t represents the time and P the photocurrent obtained.

The following information is given in connection with the operation of the system of FIG. 1. The second plate 38 is driven, by piezoelectric means 39, in a continuous translation movement with a speed controllable by means of the reflector 43 (associated with the optics 47), whose movement is controlled, in the interferometer having the optical coupler 20, with the aid of the laser emitter 6, whose light reaches the second coupler 20 by the fiber 34, or with the aid of the laser emitter 4, whose light reaches the second coupler 20 by the optical coupler 30 and the fiber 34.

Thus, the position of the second plate 38 can be perfectly known by using the laser emitter 6 in the interferometer having the second coupler 20 and by counting the fringes passing during the displacement of the second plate 38, the third plate 40 being kept stationary.

As soon as the interferometer is balanced using the laser emitter 4 coupled by means of the fiber 34 (the arms of the interferometer comprising the fibers 22 and 23 then having the same optical length), there is no further displacement in translation of either the third plate 40 or the first plate 36. The second plate 38 is displaced in translation by the piezoelectric means 39. Thus, the photodetectors 52 and 54 supply interferogram signals. The photodetector 54 supplies a reference signal. The photodetector 52 supplies a signal characteristic of the optical reflection properties of the waveguide 2 and which is compared with the reference signal by correlation, in order to obtain in accurate manner the optical properties of the waveguide 2.

For example, if the waveguide 2 is a "perfect" mirror, as are the reflectors 42, 43 and 48 (respectively associated with the optics 45, 47 and 50), the two interferograms are perfectly identical and superimposable.

It is on the basis of the differences between the signals that it is possible to locate the diopter of the optical waveguide 2 and its reflection coefficient is measured as a function of the wavelength.

We claim:

1. Interferometric system for the detection and location of reflecting faults of a light guiding structure (2), said system comprising:

an incoherent light source (4), a monomode laser source (6), whose wavelength is substantially equal to a central wavelength of the incoherent source, first (10) and second (20) optical couplers, each of said first and second couplers (10, 20) having first and second branches, said first branches (11, 21) being optically coupled to the incoherent light source and to the laser source, a first support (36) displaceable in translation in a given direction and to which are fixed ends of the second branches (12, 22) of the first and second couplers, a second support (38) adapted to oscillate in said given direction, first (42) and second (43) light reflectors fixed to the second support (38) and respectively placed facing the ends of the second branches (12, 22) of the first and second couplers in order to reflect the light passing out of the same, a third support (40) displaceable in translation in the given direction and to which is fixed an end of a third branch (23) of the second coupler (20), a third light reflector (48) fixed and positioned facing said end of the third branch (23) of the second coupler (20) in order to reflect the light passing out of the end of the third branch of the second coupler, a third branch (13) of the first coupler (10) being optically coupled to the guiding structure (2), first (52) and second (54) photodetectors respectively optically coupled to fourth branches (14, 24) of the first (10) and second (20) couplers, an interference fringe counter (56) having an input which receives signals from the second photodetector (54) and means (58) for analyzing signals supplied by the first and second photodetectors (52, 54), said analyzing means serving to locate reflecting faults of the guiding structure (2), with the aid of appropriate displacements of the first, second and third supports and the counter.

2. An interferometric system according to claim 1, further comprising a third optical coupler (30), whose first (31) and second (32) branches are respectively optically coupled to the incoherent source (4) and to the laser source (6) and whose third (33) and fourth (34) branches are respectively optically coupled to the first branches (11, 21) of the first (10) and second (20) couplers.

3. An interferometric system according to claim 1, wherein the analysis means comprise a two-channel oscilloscope (58) respectively receiving the signals supplied by the first (52) and second (54) photodetectors, said oscilloscope displaying the interferograms corresponding to the signals.

4. An interferometric system according to claim 1,k further comprising piezoelectric means (39) able to oscillate the second support (38) in the given direction.

5. An interferometric system according to claim 4, further comprising means (66, 68, 70, 72, 78, 80, 84, 86) for regulating the displacement speed of the second support (38), said regulating means imposing a constant displacement speed on the second support.

6. An interferometric system according to claim 5, wherein the regulating means comprise a Michelson interferometer having a light source (66), whose coherence length is greater than an amplitude of displacement of the second support (38), two arms respectively terminated by two light reflectors (70, 72), whereof one of said two light reflectors (72) is rendered rigidly integral with the second support (38) and a third photodetector (68), as well as means (78, 80, 84, 86) for controlling the piezoelectric means (39) as a function of the signals supplied by said third photodetector (68), said control means imposing a constant displacement speed on the second support via the piezoelectric means.

* * * * *

UNITED STATES PATENT AND TRADEMARK OFFICE
CERTIFICATE OF CORRECTION

PATENT NO. : 5,500,733
DATED : March 19, 1996
INVENTOR(S) : Boisrobert, et. al.

It is certified that error appears in the above-indentified patent and that said Letters Patent is hereby corrected as shown below:

Title page, item [75], inventors: Cities of the two inventors should be--
Christian Boisrobert, Perros Guirec;
Jean-Francois Lucas, Caouennec--.

Title page, item [56], References Cited, add the followings--
2140640     5/9    Japan--.

Title page, item [56] under Other Publications, add--

JOURNAL OF THE OPTICAL SOCIETY OF AMERICA, Vol. 7, No. 5, May 1990, NY, USA, pgs. 857-867, K. Takada et al., "Interferometric Optical-Time-Domain Reflectometer To Determine Backscattering Characterization of Silica-Based Glass Waveguides".

HEWLETT-PACKARD JOURNAL, Vol. 44, No. 1, February 1993, Palo Alto, CA, pgs. 39-48, H. Booster et al., "Design of a Precision Optical Low-Coherence Reflectometer".--

UNITED STATES PATENT AND TRADEMARK OFFICE
CERTIFICATE OF CORRECTION

PATENT NO. : 5,500,733
DATED : March 19, 1996
INVENTOR(S) : Boisrobert, et. al.

It is certified that error appears in the above-indentified patent and that said Letters Patent is hereby corrected as shown below:

Title page, item [57], Abstract: line 13, delete "said" and insert --the one--.

Column 2, line 38, delete --,-- (comma).

Column 3, line 25, after "36" insert --,-- (comma);
line 25, delete "and" (second occurrence);
line 32, before "plate" insert --first--;
line 43, after "being" insert --positioned--;
line 44, delete "positioned";
line 52, before "plates" insert --first and second--; and
line 65, delete "said".

Column 4, line 7, delete "first and";
line 8, delete "second"; and
line 9, before "couplers" insert --first and second--.

Column 5, line 62, before "plate" insert --second--.

Column 7, line 19, delete "at" and insert --of--; and
line 29, delete "I(t)=Io(1+((4πF(t)/1))" and insert --I(t) = Io(1 + cos((4π F(t)*t)/1))--.

UNITED STATES PATENT AND TRADEMARK OFFICE
CERTIFICATE OF CORRECTION

PATENT NO. : 5,500,733
DATED : March 19, 1996
INVENTOR(S) : Boisrobert, et. al.

It is certified that error appears in the above-indentified patent and that said Letters Patent is hereby corrected as shown below:

Column 10, line 16 (claim 4, line 1) delete "l,k" and insert --l,--.

Signed and Sealed this

Nineteenth Day of November, 1996

Attest:

BRUCE LEHMAN

Attesting Officer     Commissioner of Patents and Trademarks